May 7, 1963

A. T. CAMP 3,088,858

SOLVENTLESS PROCESSED NITROCELLULOSE PROPELLANTS
CONTAINING LEAD COMPOUNDS

Filed April 30, 1953

INVENTOR.
ALBERT TALCOTT CAMP

BY
ATTORNEYS

May 7, 1963  A. T. CAMP  3,088,858
SOLVENTLESS PROCESSED NITROCELLULOSE PROPELLANTS
CONTAINING LEAD COMPOUNDS
Filed April 30, 1953  5 Sheets-Sheet 2

INVENTOR.
ALBERT TALCOTT CAMP
BY
ATTORNEYS

INVENTOR.
ALBERT TALCOTT CAMP
ATTORNEYS

INVENTOR.
ALBERT TALCOTT CAMP
ATTORNEYS

INVENTOR.
ALBERT TALCOTT CAMP
ATTORNEYS

United States Patent Office 3,088,858
Patented May 7, 1963

3,088,858
SOLVENTLESS PROCESSED NITROCELLULOSE PROPELLANTS CONTAINING LEAD COMPOUNDS
Albert T. Camp, China Lake, Calif., assignor to the United States of America as represented by the Secretary of the Navy
Filed Apr. 30, 1953, Ser. No. 352,312
9 Claims. (Cl. 149—91)
(Granted under Title 35, U.S. Code (1952), sec. 266)

The invention described herein may be manufactured and used by or for the Government of the United States of America for governmental purposes without the payment of any royalties thereon or therefor.

This invention relates to gas producing charges; more particularly, it relates to double base propellants exhibiting very low dependence of performance on changes in temperature.

A controlling factor in the development of rocket propellants is the slope $n$, or pressure exponent, of the curve produced by a logarithmic graph of the burning rate of the propellant plotted against pressure. This factor, of course, is particularly important in the zone of useful rocket pressures, roughly, 700 to 3000 p.s.i. absolute. The relationship between the pressure at which a propellant burns and its burning rate is mathematically expressed as $r=cp^n$ or as $\log r = n \log p + \log c$, where $r$ is the burning rate, $p$ is the pressure at which the burning rate is measured, and $c$ and $n$ are constants characteristic of a given propellant. A plot of $\log r$ against $\log p$ for conventional propellants produces a straight line of slope $n$, that is, there is a progressive increase in burning rate for each increase in pressure.

The above characteristic is disadvantageous in propellants for jet actuated devices wherein it is highly desirable to have the value of $n$ as low as possible and certainly below .7 in the zone of useful rocket pressures. For example, variations of performance due to changes in temperature, burning rates and operating pressures of prior propellants in the zone of useful rocket pressures necessitated expensive fire control apparatus designed to correct for these undesirable results. Further, heavy walled rocket motors were required to withstand the very high pressures developed at high temperatures of firing when prior art propellants were used, and the propellants were highly inefficient because of the low pressure and thrust developed with them at low temperatures of firing.

Prior research to remove these difficulties resulted in the development of plateau type propellants in which the pressure exponent was zero in a certain region of pressure. These propellants were made by the addition of certain modifiers to the conventional type double base propellants. While this type propellant was a vast improvement over prior propellants it was still subject to certain aberrations in performance with changes in initial powder temperature. These propellants were also limited by the requirement that they be quite low in calorific value or in energy of explosion. This resulted in the production of propellants having a specific impulse some 20 or 30 percent lower than that of prior art propellants. The propellants were also slower burning than prior art systems because of their lower energy. Nevertheless, the advantage of the zero pressure exponent made feasible the development of rockets having a somewhat higher overall performance than rockets restricted to the use of prior art propellants.

The present invention relates to propellants exhibiting the mesa phenomenon. These mesa-type propellants are characterized by the fact that the slope $n$ of the curve representing their pressure-burning rate relationship becomes zero at some point and then reaches a negative value thereafter in the region of useful rocket pressures, that is, the burning rate in this negative slope region actually decreases with increase in pressure.

The above phenomenon results in a number of advantages. For example, the negative pressure exponent serves as a safety valve in case of sudden large changes in burning surface during the operation of a rocket, such as that caused by cracking of the grain. With prior art propellants such a failure of the grain would ordinarily result in destruction of the rocket motor, but in the present type propellants only a small pressure increase results. Further, there is an inherent tendency for overlapping of rate-pressure relationships at various temperatures as illustrated by logarithmic graphs of the relationships, that is, in certain regions of pressure the burning rate of a propellant for firings at low temperature may actually by higher than the burning rate for firings at high temperature. Further, the variation in performance with change in temperature for mesa type propellants is negligible and in some cases there is none at all. This advantage is particularly useful as respects fire control considerations in the design of aircraft rockets to be fired at moving targets. Further, the burning rate and energy content of the present propellants are higher than those of prior art and can be controlled at will over rather wide limits.

In addition to the above properties which are characteristic of mesa type propellants in general and desirable in a propellant for jet actuated devices, a suitable propellant should possess other requisite properties for propellants. For example, it should have good surveillance or shelf-life characteristics, it should lend itself readily to a feasible mass-production process, it should exhibit reproducibility and possess physical properties permitting its satisfactory operation over a very wide temperature range, for example, −65° F. to 165° F.

It is, therefore, an object of this invention to provide a double base propellant of the mesa type in which the pressure-burning rate relationship is such that burning rates remain substantially constant over wide temperature and pressure ranges between 700 to 3000 p.s.i. absolute.

It is another object of this invention to provide a propellant having a low temperature coefficient of equilibrium pressure within the useful range of rocket pressures and temperatures.

It is still another object of this invention to provide a propellant having substantially no performance change over a temperature range of −30 to 130° F. and a performance change of not more than about 0.1% per degree Fahrenheit over the complete service temperature range of −65 to 165° F.

It is a further object of this invention to provide a propellant having good surveillance characteristics and one which can be manufactured in mass quantities with reproductible characteristics.

It has been found that the above and other objects can be accomplished by a nitrocellulose-nitroglycerin double base propellant to which has been added, in addition to the usual plasticizers and stabilizers, a ballistic modifier comprising lead salicylate, lead acetylsalicylate, or lead 2,4 dihydroxybenzoate or mixtures thereof, either alone or in combination with a lead salt of an organic acid other than salicyclic acid. Preferred secondary lead salts are lead 2-ethylhexoate and lead stearate. These lead salts and the amounts in which they are present are critical. The critical percentage range of these catalysts is from about 2 to about 5 percent, singly or combined. That is, the total content of lead compound should be at least 2% for best results and there is no advantage to the use of more than 5% lead compounds.

In addition to the above catalytic modifiers, the double base propellent composition should comprise as basic ingredients from about 44 to about 60 percent nitrocellulose, from about 28 to 47 percent of nitroglycerin, or equivalent thereof, from about 1 to about 5 percent of a stabilizer such as symmetrical diethyl diphenyl urea or 2-nitrodiphenylamine, and from about 3 to 15 percent of a non-explosive plasticizer such as diethyl phthalate, triacetin, dipropyl adipate, dimethyl sebacate, dibutyl phthalate. It is highly important that the components be substantially non-volatile as it is a salient feature of the invention that the propellant composition is substantially free of volatile organic material. It is critical that heat of explosion of the propellant be not more than about 1100 calories per gram in order that it possess mesa characteristics.

It is critical to the operation of the invention that a solventless process be used to manufacture the propellant to insure that no solvent is present in the finished propellant and still more important that the product is substantially homogeneous.

The preferred method of making the propellant is as follows: The nitrocellulose is mixed to a thin slurry in about 10 times its weight of warm water and finely ground 2-nitro diphenylamine added slowly. A solution of lead 2-ethylhexoate in 2-3 times its weight of warm diethyl phthalate is admixed with the slurry. A solution of the nitroglycerin in the remaining diethyl phthalate to be used is slowly added to the slurry. Thereafter, the slurry is filtered or centrifuged to remove most of the water and the resulting paste is aged for a period of 1 to 5 days or more at a temperature of about 130° F. It is then dried to a moisture level of from 8 to 15 percent, the lead salicylate added to the partially dried paste and the mixture milled to a homogeneous colloid on a heated differential rolling mill. The method of mixing is not critical, provided distribution of all ingredients is uniform and no losses of ingredients occur which are not otherwise accounted for. The sheet propellant formed may be extruded into the desired form of column or tube in a warm press. The above method was used to make the propellants of the examples given in Table I below, the substituted ingredients in some of the examples having no effect on the application of the process. The mixing operation may also be done by a damp process in conventional Schroeder bowl or Sigma blade, or Talley mixers. In this case the lead salicylate is preferably added to the damp nitrocellulose before the other ingredients. The object is to achieve optimum homogeneity. Slightly modified procedures have been shown to be equivalent provided that they do not cause maldistribution of any ingredients.

The advantages of the invention will appear from the description which follows, taken in connection with the drawings, which form a part of this specification and in which FIGS. 1 to 11 inclusive are graphs of the pressure-burning rate relationship for the propellants listed in Table I below, and FIGS. 12 to 15 inclusive are graphs in which average pressure, burning rate, maximum velocity and observed time to target (1000 yards) are plotted separately against firing temperature for the preferred propellant of this invention and N-4 propellant, for comparative purposes. N-4 propellant is a conventional type propellant of the following composition:

| | |
|---|---|
| Nitrocellulose (percent N:12.6) | 50.75 |
| Nitroglycerin | 34.28 |
| Diethylphthalate | 11.24 |
| 2-nitrodiphenylamine | 1.84 |
| Potassium sulphate | 1.55 |
| Carbon black | 0.11 |
| Lead stearate | .52 |

In the following table there is presented the percentage composition of a number of propellants chosen to illustrate the invention, together with the calculated and measured heats of explosion of the propellants and the $n$ value of the pressure-burning rate relationship curve of the propellants. The examples are listed by figure numbers, the figures, of course, being graphs of results obtained on the corresponding propellants.

TABLE I

COMPOSITION (WEIGHT PERCENT)

| Component | Fig. 1 | Fig. 2 | Fig. 3 | Fig. 4 | Fig. 5 | Fig. 6 | Fig. 7 | Fig. 8 | Fig. 9 | Fig. 10 | Fig. 11 | No Fig. |
|---|---|---|---|---|---|---|---|---|---|---|---|---|
| Nitrocellulose (12.6%N) | 50.0 | 50.0 | 50.0±2 | 49.0 | 49.0 | 47.0 | 49.0 | 51.0 | 50.0 | 49.0 | 53.0 | 52.0 |
| Nitroglycerin | 34.9 | 34.8 | 35.0±1 | 39.4 | 40.2 | | 41.8 | 33.9 | 34.2 | 35.7 | 32.6 | 35.8 |
| Diethylphthalate | 10.5 | 10.8 | 8.8±1 | 2.7 | 2.3 | 4.0 | 1.5 | 10.7 | 9.8 | 10.3 | | 2.9 |
| 2-nitrodiphenylamine | 2.0 | 2.0 | 2.0±.5 | 2.0 | 2.0 | 2.0 | 2.0 | 2.0 | 2.0 | 2.0 | 2.5 | 2.0 |
| Lead 2-ethylhexoate | 1.2 | 1.2 | 1.2±.1 | 1.2 | 1.2 | 1.2 | 1.2 | | | | | |
| Lead stearate | | | | | | | | | | | | 1.5 |
| Lead salicylate | 1.2 | 1.2 | 3.0±.5 | 3.0 | 3.0 | 1.2 | 3.0 | 1.2 | 2.0 | 3.0 | | 3.0 |
| Candelilla wax | 0.2 | | | | | | | | | | | |
| Di-n-propyladipate | | | | 2.7 | 2.3 | | 1.5 | | | | | 2.8 |
| Methriol trinitrate | | | | | | 44.6 | | | | | | |
| Lead 2,4-dihydroxybenzoate | | | | | | | | 1.2 | 2.0 | | | |
| Triacetin | | | | | | | | | | | 9.9 | |
| Lead acetylsalicylate | | | | | | | | | | | 2.0 | |

HEAT OF EXPLOSION (CAL./G.)

| | | | | | | | | | | | | |
|---|---|---|---|---|---|---|---|---|---|---|---|---|
| Calculated heat of explosion | 850 | 849 | | 999 | 1028 | 849 | 1,086 | 851 | 851 | 866 | 899 | 940 |
| Measured heat of explosion | 855 | 843 | 878 | 965 | 992 | 823 | 1,104 | | 820 | 868 | 929 | 933 |

$n$ VALUE PSEUDO-SLOPES [1] (800–1800 p.s.i.)

| | | | | | | | | | | | | |
|---|---|---|---|---|---|---|---|---|---|---|---|---|
| 10° F | −0.340 | −0.323 | | −0.260 | −0.145 | −0.028 | | | | 0.080 | −0.998 | −.450 |
| 70° F | −0.245 | −0.068 | | −0.099 | 0.101 | −0.069 | | | | 0.068 | −0.038 | −.352 |
| 130° F | −0.023 | −0.027 | | 0.142 | 0.292 | −0.061 | | | | 0.146 | 0.326 | −.307 |
| 160° F | | 0.104 | | | | | | | | | | |

[1] Computed by least squares methods.

The calculated heat of explosion was obtained by calculations now well known in the art and which are as follows: The percentages of each of the ingredients are multiplied by a respective $Qi$ value for each ingredient. These values have been determined from repeated calorimetric tests on the pure substances and checked by thermodynamic approaches. For example, the $Qi$ values for 12.6% N nitrocellulose and nitroglycerin are +956 cal./g. and 1785 cal./g. respectively. Those for diethylphthalate, 2-nitrodiphenylamine and lead salicylate are negative being −1500 cal./g., −1813 cal./g. and −752 cal./g. respectively. The algebraic sum of the products of Q*i* values times the percentage of each ingredient is the calculated heat of explosion.

The heat of explosion of the propellants was measured in a standard Parr Instrument Company plain jacket calorimeter by standard, well-known calorimeter techniques. In this test, however, substantially pure helium gas at a pressure of 25 atmospheres is used instead of oxygen used for determining heats of combustion. The combustion under helium is similar to that in a rocket motor where there is no added oxygen. That is, the products of combustion consist of nitrogen, hydrogen, carbon monoxide, carbon dioxide and water in a water-gas equilibrium composition rather than consisting of completely oxidized gases as in a heat of combustion test.

The data for curves of the pressure-burning rate relationship shown in FIGS. 1–11 inclusive were obtained according to the following procedure: Strands of propellant 0.1 inch in diameter and 7.5 inches long were coated with vinyl lacquers and dried thoroughly. A Chromel wire was inserted in one end of each strand normal to axis and 0.5 ampere capacity fuse wires were inserted in drilled holes spaced accurately 2 inches apart in each strand. The strands were individually connected to appropriate ignition and clock timing circuits and burned cigarette fashion from top to bottom in Crawford type bombs at substantially constant pressures and temperatures. Data were obtained by changing the pressure of nitrogen gas or the temperature with each new strand fired. Burning rates calculated from the record times and known length of strands were plotted on log-log paper as a function of average pressure of nitrogen. The pressure exponent "$n$" was simply measured with a protractor, it being the tangent of the angle of the rate-pressure isotherm with the horizontal. The pseudo-slope "$n$" from 800 to 1800 p.s.i. was calculated by least squares method given the best straight line between the various points from 800 to 1800 p.s.i.

Reference is made to FIGS. 1–3 inclusive, which are graphs of the pressure-burning rate relationship of three preferred propellent compositions. The samples were taken from production lots. FIG. 1 shows ballastic data obtained from the burning of extruded strands in a closed bomb. The graph represents a logarithmic plot of the burning rate in inches per second as a function of bomb pressure which remained substantially constant during the burning of each strand. It is apparent from this figure that in the pressure region of approximately 1100 lbs. to 1300 lbs. per square inch the burning rate is an inverse function of temperature, that is, the burning rate for the 10° F. firings is slightly faster than the burning rate for the higher temperature firing. The composition of this propellant is representative and includes the preferred combination of lead salicylate and lead 2-ethylhexoate. The propellant represented in FIG. 2 differs essentially in composition from that of FIG. 1 in that it does not contain the candelilla wax added to improve extrusion properties. It will be noted that this propellent composition produced essentially the same strand burning characteristics as that of FIG. 1. The composition of the propellant of FIG. 3 differs from that of FIG. 1 in that it has a higher content of the vital lead salicylate catalyst and as a result has an appreciably higher burning rate, burning at a maximum rate of 0.6 inch per second in the mesa region as compared to a burning rate of approximately 0.45 inch per second for that of the propellant of FIG. 1. An advantage of this prepellant over that of FIG. 1 is that, given the same web size, rockets powered by this propellant have a shorter time to target. It is obvious and has been demonstrated that burning rates from 0.45 to 0.6 inch per second can be obtained by simply varying the content of lead salicylate.

FIG. 4 represents a modification of the invention in which a higher content of nitroglycerin is used, thus producing a higher heat of explosion and consequently a higher specific impulse, as the table shows. This figure also illustrates the incorporation of the favorable combination of plasticizers, diethylphthalate and di-n-propyladipate, in a propellant. The combination produces improved physical properties in the propellant as well as higher heats of explosion.

Figure 1:
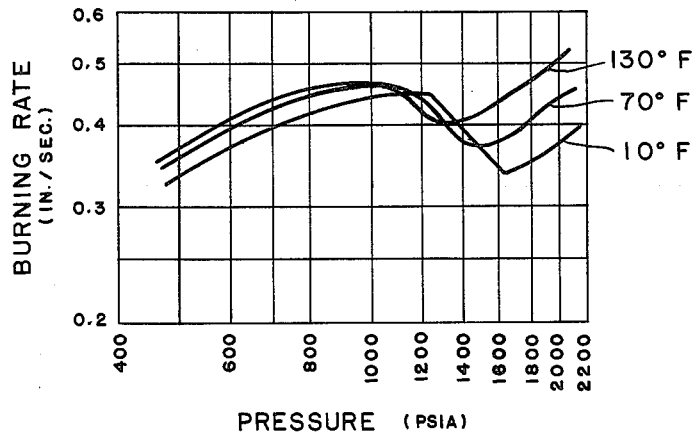
Figure 2:
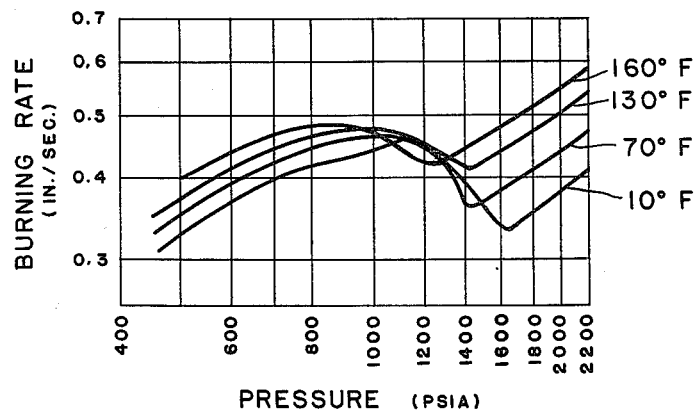
Figure 3:
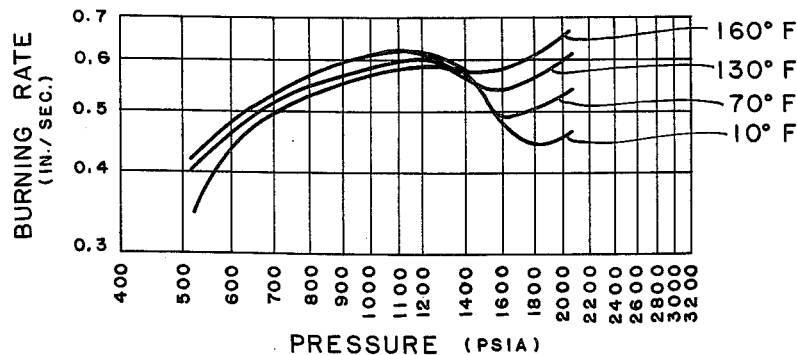
Figure 4:
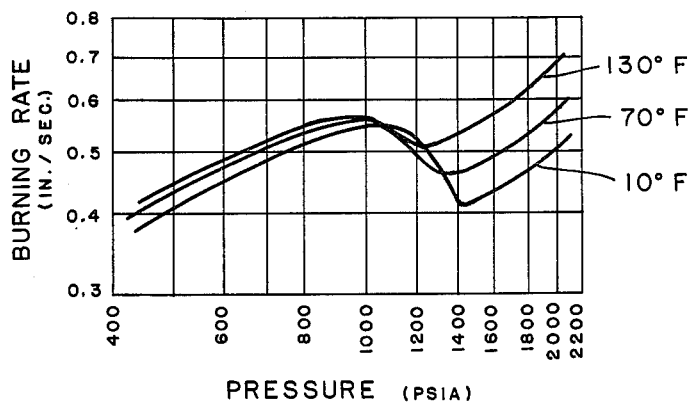
Figure 5:
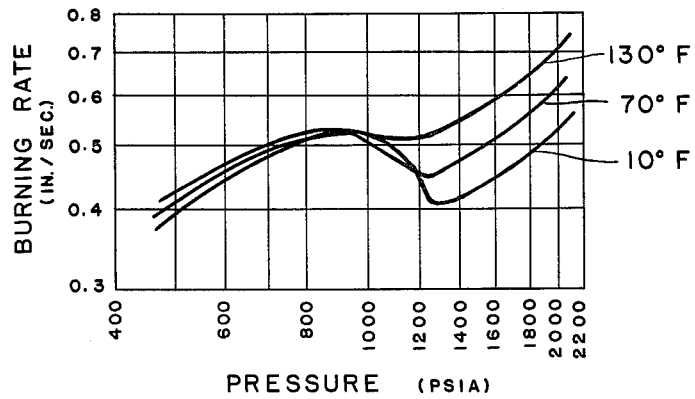
FIG. 5 shows results obtained from a propellant of a composition producing a heat of explosion near the upper limit for a satisfactory propellant. It will be noted that the propellant produced a pressure-burning rate curve having acceptable plateau or semi-mesa characteristics, but that the mesa characteristic has diminished appreciably with the increased heat of explosion.
Figure 6:
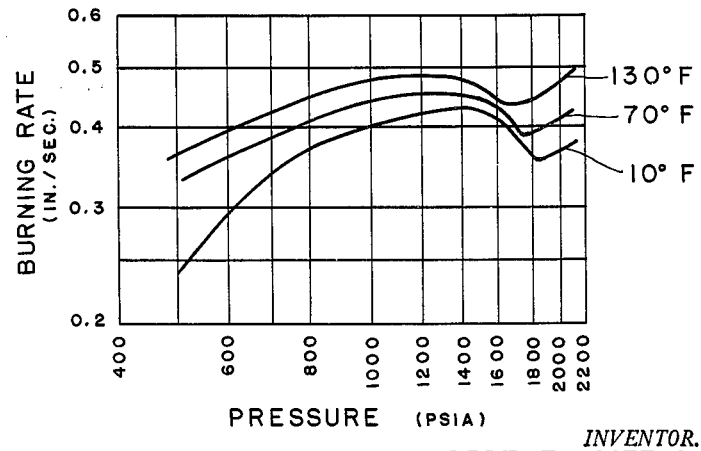
FIG. 6 represents a composition in which nitroglycerin has been replaced as the explosive plasticizer by methriol trinitrate (methyltrimethylolmethanetrinitrate). The chief advantages of this plasticizer are its reduced sensitivity and improved stability as compared to nitroglycerin.
Figure 7:
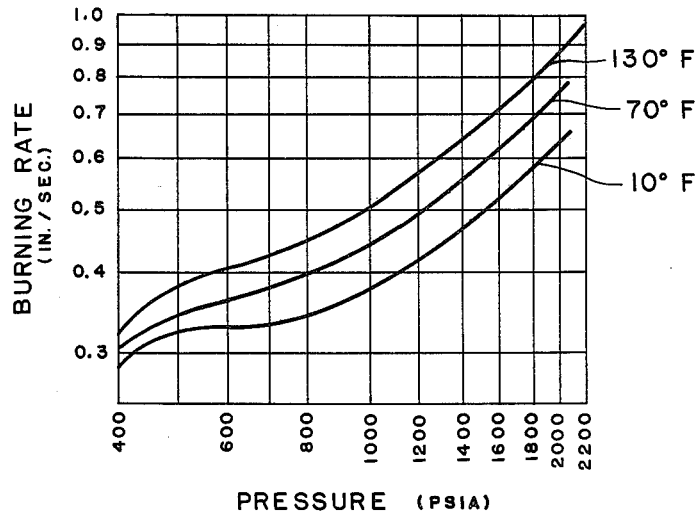

FIG. 7 shows the results obtained for a propellant having a composition adjusted to give a heat of explosion of over 1100 calories per gram. It will be noted that the mesa effect has completely disappeared and that a plateau tendency appears only at lower temperature firings at low pressure. This propellant might have possible utility in low pressure applications because of its high heat of explosion.

Figure 8:
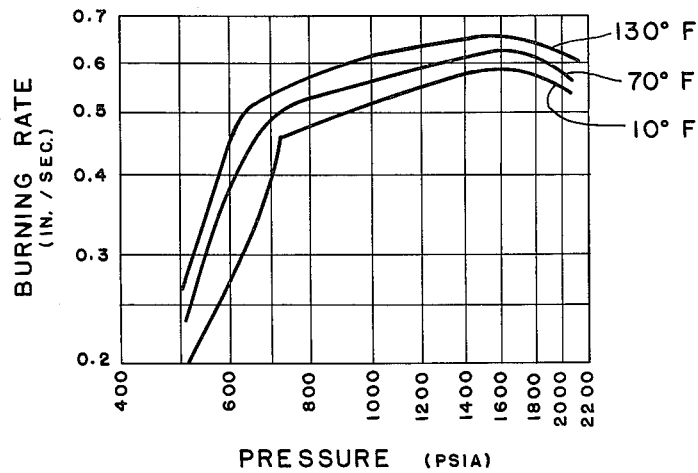
Figure 9:
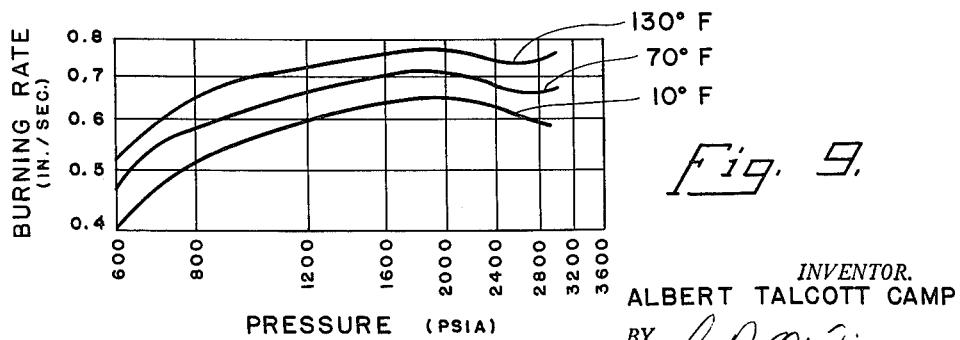

FIGS. 8 and 9 show the ballastic characteristics of propellants containing the catalyst combination of lead salicylate and lead 2,4-dihydroxybenzoate, the propellant of FIG. 9 having higher concentrations of these catalysts than that of FIG. 8. Inspection of the curves shows that the desirable mesa characteristics have been obtained in a region of higher burning rates and pressures than heretofore. For example, in FIGURE 9, representing the higher catalyst concentration, desirable performance is attained at pressures between 1200 and 2800 p.s.i. The propellants of FIGS. 8 and 9 are particularly useful in rockets designed for firing in closed-breach launchers in which the operating pressure must be near or above 2000 p.s.i.

Figure 10:
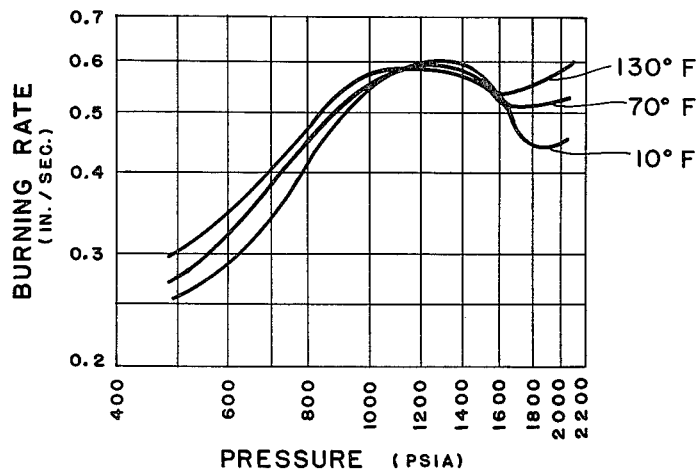

In FIG. 10 there are presented results obtained with a propellent composition in which lead salicylate is used alone as a catalyst. This example is presented for the purposes of comparison. The useful operating pressure range of this type propellant is between 1000 and 1700 p.s.i.

Figure 11:
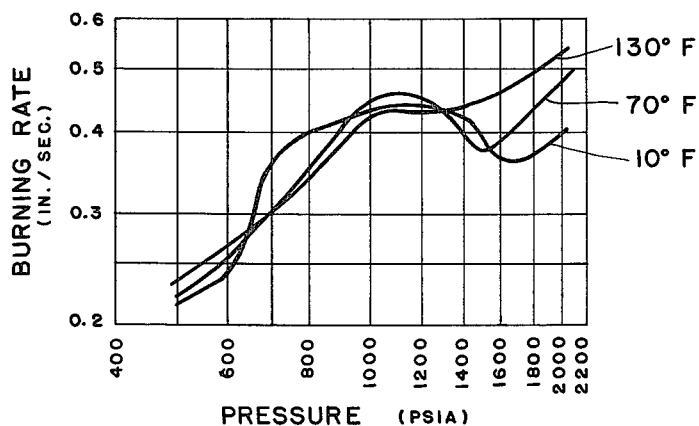
Figure 12:
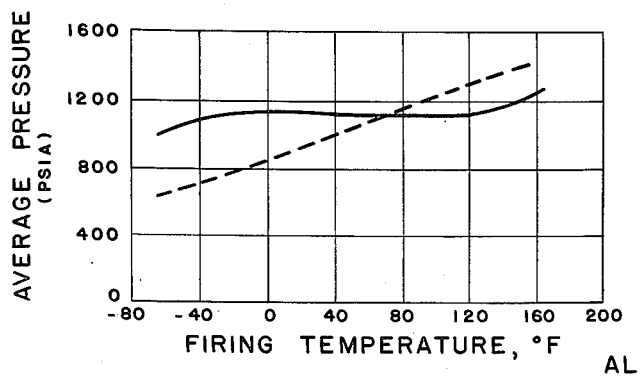
Figure 13:
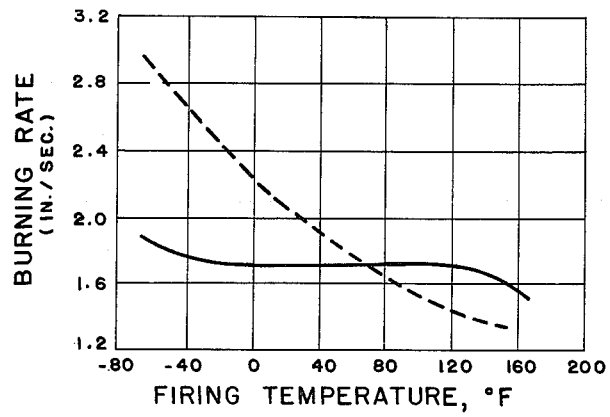
Figure 14:
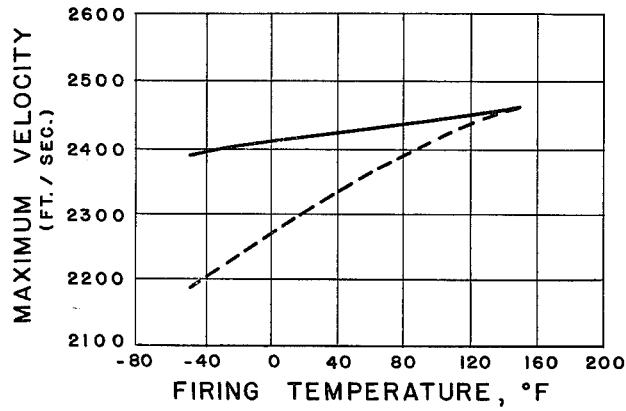
Figure 15:
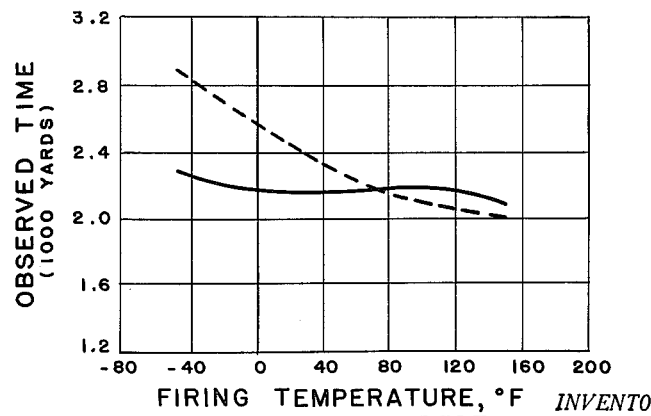

The propellant represented by FIG. 11 is a modification in which lead acetyl salicylate is substituted for lead salicylate as the catalyst. This compound is made from litharge and aspirin. The performance of this propellant is comparable to that of FIG. 10 in which lead salicylate was used alone. As shown in FIG. 11, mesa type ballastics were obtained at a heat of explosion of 929 calories per gram. The chief advantage of this catalyst for this use residese in the fact that it is soluble in the propellent colloid. It is useful in applications where it is desirable to have a clear propellant for ease of inspection and where a soluble derivative of lead salicylate is desirable because the processing of the propellant is necessarily limited. The inert plasticizer triacetin used in this example is a common plasticizer used in double base systems and represents a variation from the diethylphthalate used in most of the examples.

FIGS. 12–15 inclusive are comparative showings of performance characteristics of one of the preferred compositions and N–4, one of the best service propellants previously available, in an actual rocket system, the 2.75-inch folding fin aircraft rocket. These graphs show conclusively that the performance characteristics of the propellant of this invention are not affected at all by temperature changes within the range of −30 to 130° F. and within the service temperature range of −65 to 165° F. the variation of performance with temperature is about one-fourth that of N–4.

It will be noted from the examples that the upper limit of heat of explosion for a satisfactory propellant exhibiting the mesa characteristic is in the neighborhood of about 1100 calories per gram. As stated previously, this is considered a critical limitation.

Routine and accelerated ageing tests proved that the propellant was not undesirably affected by storage over long periods of time. The propellant gave good Taliani stability, produced no red fumes or explosion in the 120° C. methyl violet test after 5 plus hours, and presented no evidence of cracks or fissures after storage for as long as 90 days at 80° C. Tensile, shear and compression tests over a wide range of temperatures proved that the propellant was satisfactory with respect to these properties. In extensive tests of a preferred composition in the 2.75-inch folding fin aircraft rocket popularly known as the "Mighty-Mouse" shock temperature cycling between —65 and 165° F. for 14 cycles caused no malfunctions in firing. Rockets fired after 100 days of storage at 130° F. or 20 days of storage at 165° F. showed substantially the same performance as unstored rockets.

Obviously many modifications and variations of the present invention are possible in the light of the above teachings. It is therefore to be understood that within the scope of the appended claims the invention may be practiced otherwise than as specifically described.

What is claimed is:

1. A solventless processed propellent composition comprising from about 44 to about 60 percent of nitrocellulose; from about 1 to about 5 percent of at least one compound from the class consisting of lead salicylate, lead acetylsalicylate, and lead 2,4-dihydroxybenzoate, and from about 1 to about 2 percent of at least one compound from the class consisting of lead 2-ethylhexoate and lead stearate.

2. A solventless processed propellent composition comprising from about 44 to about 53 percent of nitrocellulose; from about 28 to about 47 percent of at least one compound from the class consisting of nitroglycerin and methyltrimethylolmethanetrinitrate; and from about 2 to about 5.0 percent of at least one compound from the class consisting of lead salicylate, lead acetylsalicylate, and lead 2,4 dihydroxybenzoate.

3. A solventless processed propellent composition comprising from about 44 to about 53 percent of nitrocellulose; from about 32 to about 47 percent of at least one compound from the class consisting of nitroglycerin and methyltrimethylolmethanetrinitrate; from about 1 to about 5.0 percent of at least one compound from the class consisting of lead salicylate, lead acetylsalicylate, and lead 2,4-dihydroxybenzoate; and from about 1 to about 2 percent of at least one compound from the class consisting of lead 2-ethylhexoate and lead stearate.

4. A solventless processed propellent composition comprising from about 44 to about 53 percent of nitrocellulose; from about 32 to about 47 percent of nitroglycerin, and from 2 to 5 percent of lead salicylate.

5. A solventless processed propellent composition comprising from about 44 to about 53 percent of nitrocellulose; from about 32 to about 47 percent of nitroglycerin; and about 2 to 5 percent of lead acetylsalicylate.

6. A solventless processed propellent composition comprising from about 44 to about 53 percent of nitrocellulose; from about 32 to about 47 percent of nitroglycerin; from about 1 to about 3.5 percent of lead salicylate and from about 1 to about 2 percent of lead 2-ethylhexoate.

7. The propellent composition of claim 6 to which is added 0.2 percent of candelilla wax.

8. A solventless processed propellent composition comprising from about 44 to about 53 percent of nitrocellulose; from about 32 to about 47 percent of nitroglycerin; from about 1 to about 3.5 percent of lead salicylate and from about 1 to about 3.5 percent of lead 2,4-dihydroxybenzoate.

9. A solventless processed propellent composition comprising from about 44 to about 53 percent of nitrocellulose; from about 32 to about 47 percent of methyltrimethylolmethanetrinitrate; from about 1 to about 3.5 percent of lead salicylate; and from about 1 to about 2 percent of lead 2-ethylhexoate.

References Cited in the file of this patent

UNITED STATES PATENTS

| 1,390,671 | Cope | Sept. 13, 1921 |
| 2,498,388 | Ball | Feb. 21, 1950 |

FOREIGN PATENTS

| 485,662 | Canada | Aug. 12, 1952 |